(12) United States Patent
Ueno et al.

(10) Patent No.: US 7,495,606 B2
(45) Date of Patent: Feb. 24, 2009

(54) POSITIONING INFORMATION PROCESSING APPARATUS, INFORMATION PROCESSING APPARATUS, METHOD OF PROCESSING POSITIONING INFORMATION, AND PROGRAM

(75) Inventors: Ichiro Ueno, Saitama (JP); Baiping Liao, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/551,863

(22) Filed: Oct. 23, 2006

(65) Prior Publication Data

US 2007/0126627 A1 Jun. 7, 2007

(30) Foreign Application Priority Data

Dec. 6, 2005 (JP) .............................. 2005-351529

(51) Int. Cl.
G01S 1/00 (2006.01)
(52) U.S. Cl. ................................. 342/357.06
(58) Field of Classification Search ............. 342/357.06
See application file for complete search history.

(56) References Cited

U.S. PATENT DOCUMENTS

| 6,278,404 | B1 * | 8/2001 | Niles ........................... 342/359 |
|---|---|---|---|
| 7,266,615 | B2 * | 9/2007 | Yoneya et al. ................ 709/237 |
| 2003/0221010 | A1 * | 11/2003 | Yoneya et al. ................ 709/227 |
| 2004/0226775 | A1 * | 11/2004 | Takatama et al. .............. 186/53 |
| 2004/0252053 | A1 * | 12/2004 | Harvey .................... 342/357.15 |
| 2005/0074153 | A1 * | 4/2005 | Pedrizzetti et al. ........... 382/128 |
| 2005/0143916 | A1 * | 6/2005 | Kim et al. .................... 701/214 |
| 2005/0197125 | A1 * | 9/2005 | Kang et al. .................. 455/439 |
| 2006/0055596 | A1 * | 3/2006 | Bryant et al. ........... 342/357.06 |
| 2007/0054640 | A1 * | 3/2007 | Wada et al. .............. 455/226.1 |
| 2007/0243886 | A1 * | 10/2007 | Taniguchi ................ 455/456.4 |
| 2007/0295822 | A1 * | 12/2007 | Kawai ........................ 235/492 |

FOREIGN PATENT DOCUMENTS

JP 2004-233150 8/2004

* cited by examiner

*Primary Examiner*—Thomas H Tarcza
*Assistant Examiner*—Harry Liu
(74) *Attorney, Agent, or Firm*—Oblon, Spivak, McClelland, Maier & Neustadt, P.C.

(57) ABSTRACT

A positioning information processing apparatus includes positioning information acquiring means for acquiring positioning information at predetermined standard time intervals; and positioning information transmitting means for transmitting outside the positioning information acquired by the positioning information acquiring means through a predetermined data communication path only if the positioning information is effective.

11 Claims, 8 Drawing Sheets

POSITIONING INFORMATION PROCESSING APPARATUS, INFORMATION PROCESSING APPARATUS, METHOD OF PROCESSING POSITIONING INFORMATION, AND PROGRAM

CROSS REFERENCES TO RELATED APPLICATIONS

The present invention contains subject matter related to Japanese Patent Application JP 2005-351529 filed in the Japanese Patent Office on Dec. 6, 2005, the entire contents of which are incorporated herein by reference.

BACKGROUND OF THE INVENTION

1. Field of the Invention

The present invention relates to a positioning information processing apparatus and a method of processing positioning information, which are capable of acquiring positioning information by the use of, for example, a global positioning system (GPS), and to a program executed by the positioning information processing apparatus. The present invention also relates to an information processing apparatus having a structure as the positioning information processing apparatus.

2. Description of the Related Art

Consumer devices having functions of measuring positions by the use of, for example, GPSs (devices supporting GPSs) are in wide spread use. In the present circumstances, vehicle navigation apparatuses, portable positioning apparatuses for climbing, mobile phones having GPS positioning functions, and so on are well known. For example, a cellular phone with a positional information function is disclosed in Japanese Unexamined Patent Application Publication No. 2004-233150.

SUMMARY OF THE INVENTION

The scope of GPS functions is considered to be spread over devices other than the above-mentioned ones against such a background. In this case, the following problems can be caused depending on combination of the GPS functions and devices.

In order to realize the GPS functions, it is necessary to mount devices (GPS devices) that receive radio waves transmitted from GPS satellites and perform positioning calculation to acquire positioning information including positional information. Such GPS devices usually have specifications in which the positioning information is transmitted every predetermined time (for example, every one second). The central processing units (CPUs) of apparatuses including the GPS devices acquire the positioning information transmitted every predetermined time and perform response processing in accordance with, for example, predetermined application software. Accordingly, it is possible to update information concerning the current position that sequentially varies with movement of the apparatuses and to correctly present the current position and the like with interfaces including maps.

However, the exchange of the positioning information between the GPS devices and the CPUs requires the CPUs to perform interrupt processing every predetermined time.

Substantially high loads can be imposed on the CPUs of some apparatuses even in order to realize the built-in functions of the apparatuses without the GPS functions being added. Adding the GPS functions to such apparatuses further increases the load on the CPUs because the CPUs relatively frequently perform the interrupt processing in response to the positioning information transmitted from the GPS devices. The increase in the load on the CPUs can adversely affect the operation and performance of the apparatuses. For example, the processing speeds of the apparatuses can be decreased.

It is desirable to reduce the load on the information processing systems of various apparatuses even when functions supporting positioning systems, such as the GPS, are added to the apparatuses.

According to an embodiment of the present invention, a positioning information processing apparatus includes positioning information acquiring means for acquiring positioning information at predetermined standard time intervals; and positioning information transmitting means for transmitting outside the positioning information acquired by the positioning information acquiring means through a predetermined data communication path only if the positioning information is effective.

According to another embodiment of the present invention, an information processing apparatus includes positioning information acquiring means for acquiring positioning information at predetermined standard time intervals; positioning information transmitting means for transmitting the positioning information acquired by the positioning information acquiring means through a predetermined data communication path only if the positioning information is effective; and positioning information processing means for receiving and acquiring the positioning information transmitted through the data communication path and using the positioning information to perform a process for realizing a predetermined functional operation.

According to yet another embodiment of the present invention, a method of processing positioning information includes the steps of acquiring the positioning information at predetermined standard time intervals; and transmitting outside the positioning information acquired by the positioning information acquiring step through a predetermined data communication path only if the positioning information is effective.

According to further another embodiment of the present invention, a program causes a positioning information processing apparatus to execute the steps of acquiring positioning information at predetermined standard time intervals; and transmitting outside the positioning information acquired by the positioning information acquiring step through a predetermined data communication path only if the positioning information is effective.

The "effective" in terms of the positioning information means that at least positional information, among information items in the positioning information, is effective. Conversely, the positioning information acquired when the positional information is not correctly calculated for some reason is called "ineffective positioning information". However, the definition of the effectiveness and ineffectiveness of the positioning information is based on the effectiveness and ineffectiveness of the positional information included in the positioning information, as described above. Accordingly, even ineffective positioning information can be useful in an application on the basis of the positioning information.

The positioning information is acquired by the positioning information acquiring means in the above structures. The positioning information is divided into the one whose content is effective and the one whose content is ineffective because effective positional information is not acquired. According to the embodiments of the present invention, effective positioning information is transmitted only if the positioning succeeds to provide the effective positioning information and ineffective positioning information is not transmitted. In contrast, in related art, the positioning information is transmitted at standard time intervals at which the positioning information is acquired regardless of whether the content of the positioning information is effective or ineffective.

Consequently, in the structures according to the embodiments of the present invention, the transmission frequency of the positioning information per unit time becomes lower than that in the related art.

According to the present invention, since the frequency of the transmission of the positioning information from the positioning information processing apparatus is lower than that in related art, the load on the information processing apparatus performing a certain process in response to the transmitted positioning information is reduced. Accordingly, it is possible to suppress a reduction in the performance of the information processing apparatus, which uses the positioning information to realize a certain functional process, and to improve the reliability of the apparatus.

DESCRIPTION OF THE PREFERRED EMBODIMENTS

Embodiments of the present invention will be described with reference to the accompanying drawings.

Figure 1:
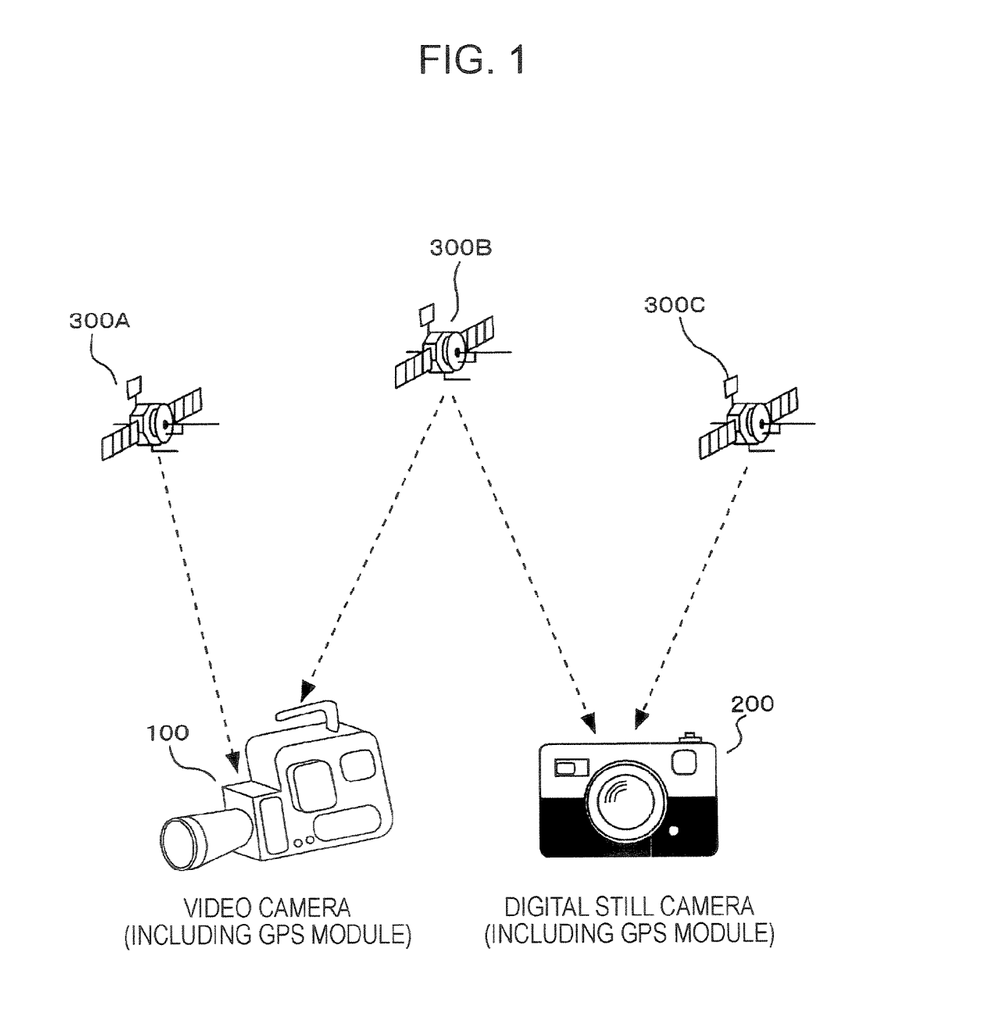
FIG. 1 schematically shows an example of the structure of a system including imaging apparatuses and GPS satellites, according to an embodiment of the present invention.

A positioning information processing apparatus according to an embodiment of the present invention is built in a portable imaging apparatus, such as a video camera 100 or a digital still camera 200 shown in FIG. 1, as a GPS module. The GPS module is a part or apparatus capable of receiving radio waves transmitted from GPS satellites and performing positioning calculation to acquire positioning information.

As shown in FIG. 1, the video camera 100 and the digital still camera 200 use the built-in GPS modules to receive radio waves from multiple GPS satellites 300A to 300C and perform positioning calculation by a predetermined positioning method in order to acquire at least information concerning the current position as the positioning information.

Figure 2:
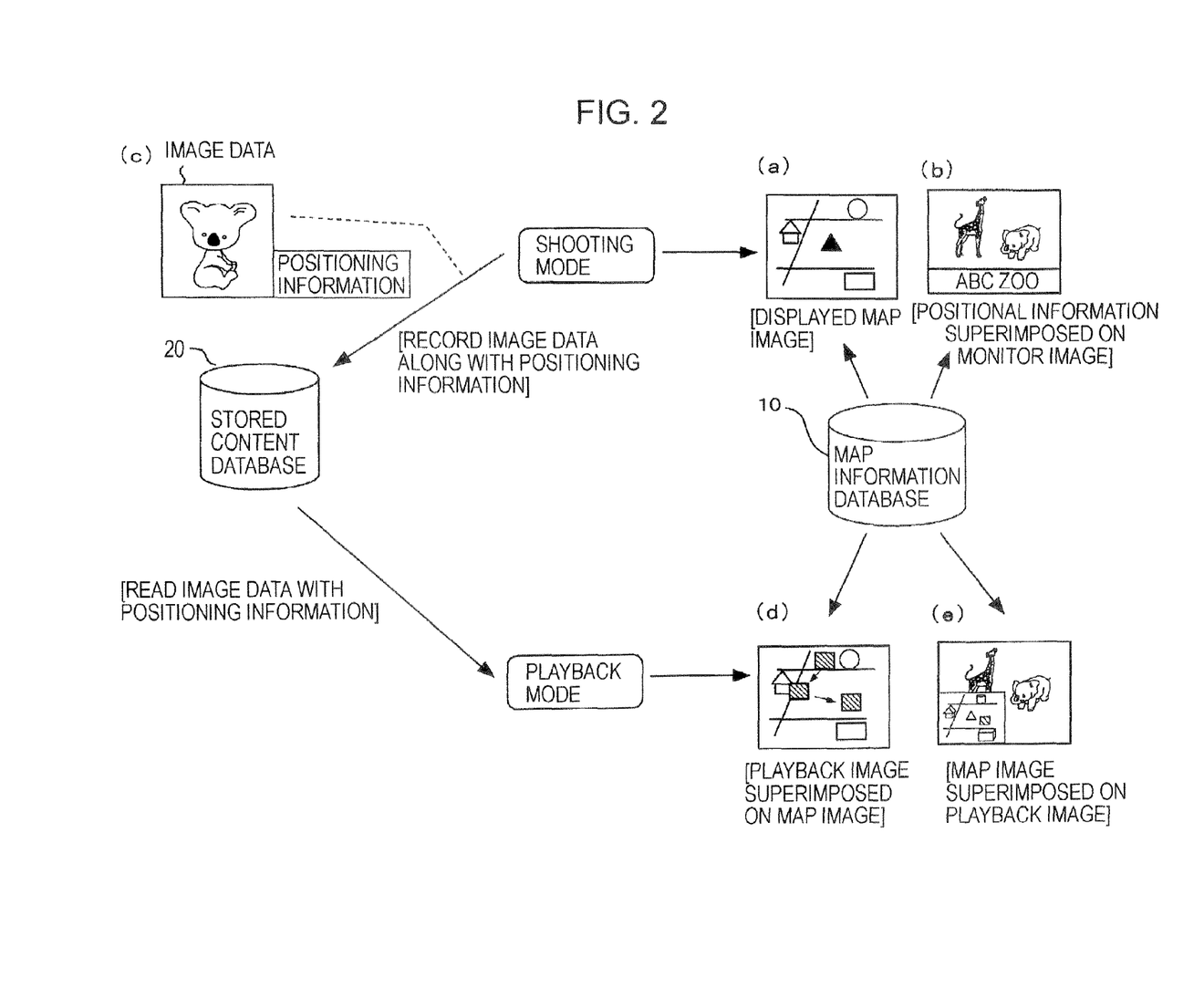
FIG. 2 shows examples of applications of a GPS function of the imaging apparatus according to the embodiment of the present invention.

FIG. 2 shows examples of applications and functions using the positioning information acquired by the use of the video camera 100 or the digital still camera 200.

The video camera 100 and the digital still camera 200 according to the embodiment of the present invention are each provided with a map information database 10. Image information about a map, positional information on the map, a variety of additional information, and so on are stored in the map information database 10. Data in the map information database 10 is stored in a storage medium, such as a flash memory or a hard disk, included in the video camera 100 or the digital still camera 200.

In a shooting mode in which a captured image can be recorded on the storage medium, a shooting position is displayed in a map image on a monitor screen, as shown by (a) in FIG. 2. Specifically, data on the map image including the position indicated by information concerning the current position is read out from the map information database 10 on the basis of the current position information acquired by the GPS module, and the readout data is displayed in the map image along with, for example, a mark indicating the current position.

Alternatively, as shown by (b) in FIG. 2, information, such as characters, concerning the shooting position is superimposed on a captured image displayed on the monitor screen. Also in this case, guide information represented by the use of characters is read out from the map information database 10 on the basis of the current position information acquired by the GPS module as additional information concerning the position indicated by the current position information, and a display control process is performed so as to display the readout guide information on the monitor screen. The image on which the additional information is superimposed may be recorded as a captured image.

According to the embodiment of the present invention, image data that is captured and recorded in the shooting mode has a structure in which the positioning information (for example, the positional information) is added as the additional information, as shown by (c) in FIG. 2. In this structure, the captured image data is recorded in a stored content database 20.

The stored content database 20 is stored in a removable storage medium, which is a hardware resource and which is included in the video camera 100 or the digital still camera 200 or is loaded in the video camera 100 or the digital still camera 200.

In a playback mode of the video camera 100 and the digital still camera 200, image data is read out from the stored content database 20 to play back the readout image data. In the playback mode, positioning information added to the image data can be used to realize a display, for example, shown by (d) in FIG. 2.

In the display shown by (d) in FIG. 2, a map image including the position indicated by the positioning information added to the image data to be played back is read out from the map information database 10 and the readout map image is displayed on the entire monitor screen. Then, the position on the map is associated with the position where the image to be played back is captured and recorded to reduce the image to be played back to an image like a thumbnail.

Alternatively, as shown by (e) in FIG. 2, the image to be played back is displayed on the entire monitor screen and, then, the map image including the position where the image to be played back is captured and recorded is superimposed and displayed on a part of the monitor screen.

Adding the positioning function to the imaging apparatus, such as the video camera 100 or the digital still camera 200 according to the embodiment of the present invention, in the manner described above allows various applications, as the ones shown in FIG. 2, in which the map, the guide information concerning the shooting position, and so on are combined with each other, thus improving the entertainment level and the convenience.

Figure 3:
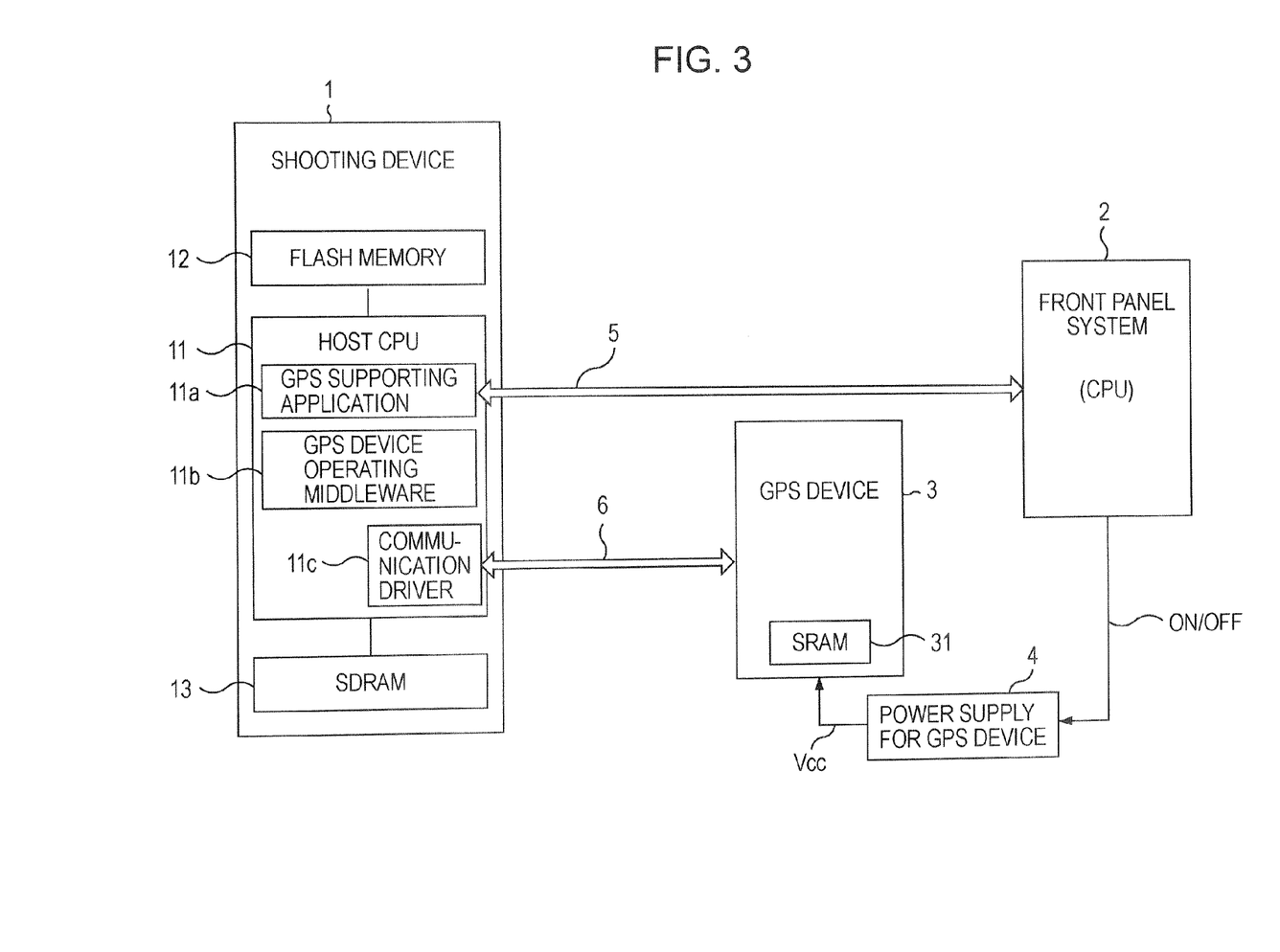
FIG. 3 is a block diagram showing an example of the internal configuration of the imaging apparatus according to the embodiment of the present invention.

FIG. 3 is a block diagram showing an example of the internal configuration of the imaging apparatus (the video camera 100 or the digital still camera 200) according to the embodiment of the present invention and the relationship between a shooting device 1 and a GPS module.

The shooting device 1 is a system component mainly realizing a built-in function of the imaging apparatus (the video camera 100 or the digital still camera 200). Specifically, for example, the shooting device 1 includes an imaging unit including a lens optical system and an imager, a signal processing unit that converts a signal yielded by the imaging unit into information concerning the captured image and performs a variety of signal processing, a storage processing unit that records the information concerning the captured image in a recording medium and plays back the information concerning the captured image, and a control unit that controls these components. When the GPS module is mounted in the shooting device 1, a communication function with the GPS module (GPS device 3) and a function of realizing the applications using positional information, such as the ones shown in FIG. 2, are added to the shooting device 1.

Referring to FIG. 3, the shooting device 1 includes a host CPU 11 corresponding to the control unit. The host CPU 11 executes programs stored in, for example, a flash memory 12 to perform a variety of control processing. A synchronous dynamic random access memory (SDRAM) 13 is used as a working area where the host CPU 11 performs a variety of processing.

The operational functions relating to the GPS function, realized by the host CPU 11 that executes the programs, are shown as functional blocks included in the host CPU 11. The functional blocks include a GPS supporting application 11a, a GPS device operating middleware 11b, and a communication driver 11c.

The GPS supporting application 11a corresponds to an application function using the positional information, such as the one described above with reference to (a), (b), (d), or (e) in FIG. 2.

The GPS device operating middleware 11b intervenes between the GPS supporting application 11a and the communication driver 11c and controls communication therebetween. The communication driver 11c includes hardware devices and firmware used for the communication with the GPS device 3 in a protocol level supporting a communication bus 6 for GPS.

In the configuration shown in FIG. 3, the main body of the GPS module according to the embodiment of the present invention is shown as the GPS device 3. The GPS device 3 receives radio waves from GPS satellites and performs positioning calculation by the use of the received radio waves to output positioning information. Power Vcc is supplied from a power supply 4 for the GPS device to the GPS device 3 to operate the GPS device 3. The power supply 4 for the GPS device is turned on/off by a front panel system 2. In the configuration shown in FIG. 3, the GPS module includes the GPS device 3 and the power supply 4 for the GPS device.

The front panel system 2 controls the entire imaging apparatus (the video camera 100 or the digital still camera 200) according to the embodiment of the present invention, including the shooting device 1, the GPS module, and other modules and systems (not shown). The front panel system 2 is, for example, a microcomputer provided with a CPU. The front panel system 2 is capable of communicating with the host CPU 11 and others in the shooting device 1 via a system bus 5.

According to the embodiment of the present invention, on-off control of the GPS device 3 is performed independently of on-off control of the shooting device 1 (the host CPU 11). Accordingly, even when the shooting device 1 is turned off for power saving, the positioning by the GPS device 3 is continued in the background and the positioning information is stored in a static random access memory (SRAM) 31. When the shooting device 1 is turned on, the shooting device 1 can use the positioning information stored in the SRAM 31.

Universal Asynchronous Receiver Transmitter (UART) is adopted as the communication bus 6 for GPS used in the communication between the GPS device 3 and the host CPU 11, although the specification for the communication bus 6 for GPS is not limited to the UART. The UART is widely used for, for example, a serial port in a computer system, as is commonly known.

National Marine Electronics Association (NMEA) is adopted as a protocol used in the communication between the GPS device 3 and the host CPU 11 via the communication bus 6 for GPS, which is the UART. Also as is commonly known, the NMEA is defined for communication between a GPS receiver and a navigation apparatus via a serial port and is adopted in various consumer devices having the GPS function.

The embodiment of the present invention is characterized by the communication between the GPS device 3 and the host CPU 11. As a comparison with the embodiment of the present invention, an exemplary communication process when a method in related art is adopted will now be described with reference to FIG. 4. For clarity, FIG. 4 shows an example in which a method in related art is used in the communication between the GPS device 3 and the host CPU 11, on the assumption that the configuration shown in FIG. 3 is adopted.

Generally, the GPS device 3, which is a module, is set so as to perform a series of processing including positioning calculation and transmission of positioning information acquired in the positional calculation at time intervals of one second (hereinafter referred to as a standard time interval). In the related art, the GPS device usually acquires the positioning information transmitted every one second in accordance with the above setting and a navigation device performs any response processing. The communication process shown in FIG. 4 is based on the method in related art and is performed among the GPS device 3, the communication driver 11c, the GPS device operating middleware 11b, and the GPS supporting application 11a.

Figure 4:
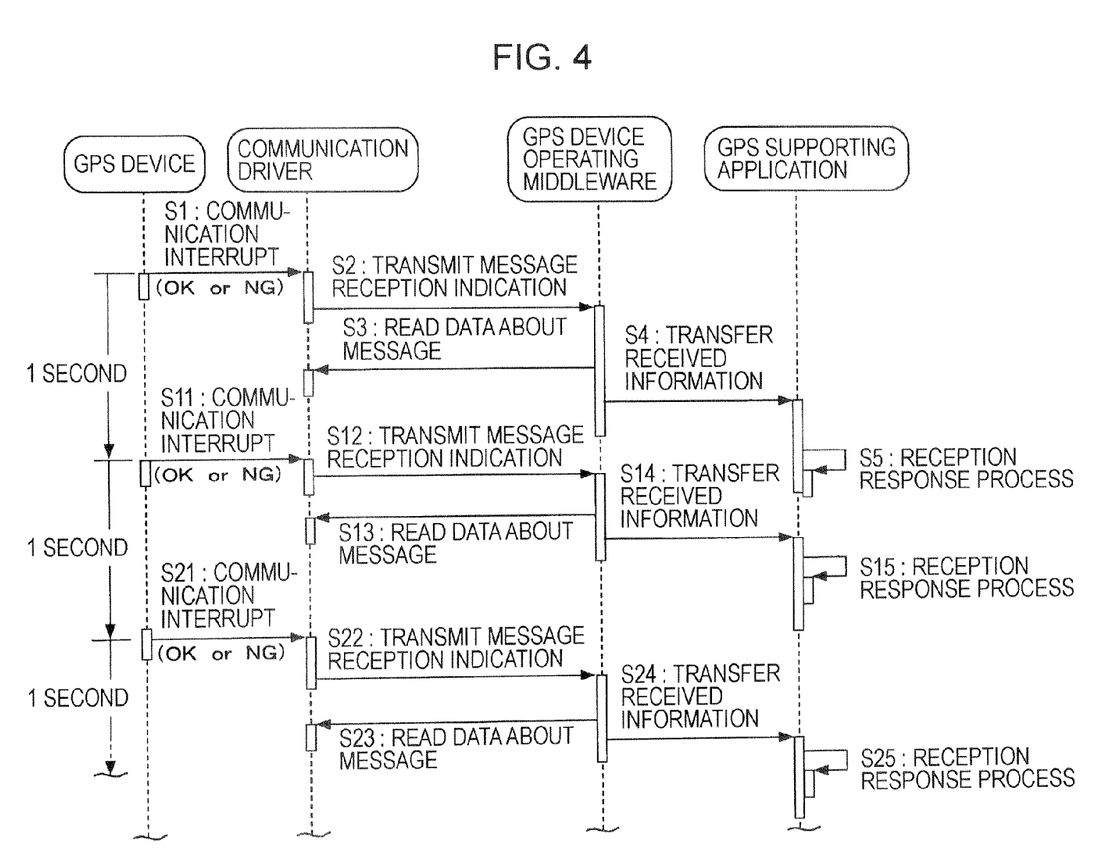
FIG. 4 shows an example of a communication process between a known GPS device and a host CPU when the operation of the known GPS device is applied to the imaging apparatus according to the embodiment of the present invention.

Referring to FIG. 4, in Step S1, the GPS device 3 transmits positioning information yielded at a certain time. The transmission of the positioning information is detected as an occurrence of a communication interrupt event by the communication driver 11c. In Step S2, the communication driver 11c transmits a message reception indication indicating that a message is received from the GPS device 3 to the higher-level GPS device operating middleware 11b in response to the occurrence of the communication interrupt event. In Step S3, the GPS device operating middleware 11b accesses the communication driver 11c to acquire data concerning the message, which is the positioning information, in response to the reception of the message reception indication. In Step S4, the GPS device operating middleware 11b transmits the acquired positioning information to the GPS supporting application 11a as the content of the received information. The GPS supporting application 11a receives the positioning information and, in Step S5, performs a predetermined process (reception response process) using the received positioning information.

After one second since the GPS device 3 performed the communication interrupt (transmitted the positioning information) in Step S1, then in Step S11, the GPS device 3 performs the communication interrupt again. In Steps S12 to S15, a sequence similar to the one in Steps S2 to S5 is performed in response to Step S11. After one second since Step S11, a sequence similar to the one in Steps S1 to S5 and the one in Steps S11 to S15 is performed in Steps S21 to S25.

In the related art, each time the positioning information is transmitted from the GPS device 3 every one second, the host CPU 11 interrupts the communication to receive the message (the positioning information) and performs the reception response process using the received positioning information.

The positioning information transmitted from the GPS device 3 includes information concerning the positioning result, indicating whether the positioning information is effective as a status. Although the GPS device 3 periodically performs the positioning calculation every one second to output the positioning information, an error can occur, for example, if the radio wave is not appropriately received from the GPS satellite because correct positional information is not produced even if the positioning calculation is performed. Alternatively, even if the radio wave has been appropriately received from the GPS satellite, the positioning calculation can result in an error for any reason. In such cases, since the calculation result indicates an error, a status indicating that the positional information is ineffective is shown as the positioning information. In contrast, if the radio wave has been appropriately received from the GPS satellite and the positioning calculation is normally performed, the positioning information including information about the measured position is transmitted, in addition to a status indicating that the positional information is effective.

If the GPS device 3 transmits the positioning information having the status indicating that the positional information is effective, the host CPU 11 can receive the measured positional information to perform the reception response process. In contrast, if the GPS device 3 transmits the positioning information having the status indicating that the positional information is ineffective, the host CPU 11 performs, as the reception response process, a required process corresponding to the positional information that is not acquired.

A communication process between the GPS device 3 and the host CPU 11 according to an embodiment of the present invention will now be described.

According to the embodiment of the present invention, a predetermined value "t" is set as a time interval at which the positioning information is transmitted from the GPS device 3. The value "t" is set so as to be larger than one. Practically, the value "t" may be set so as to exceed 10 seconds when the positioning information is used in, for example, the application shown by (a), (b), (d), or (e) in FIG. 2, although the value of "t" depends on how the positioning information is used in the application. The positioning information having the status indicating that the positional information is ineffective is not transmitted from the GPS device 3 and only the positioning information having the status indicating that the positional information is effective is transmitted from the GPS device 3.

Figure 5:
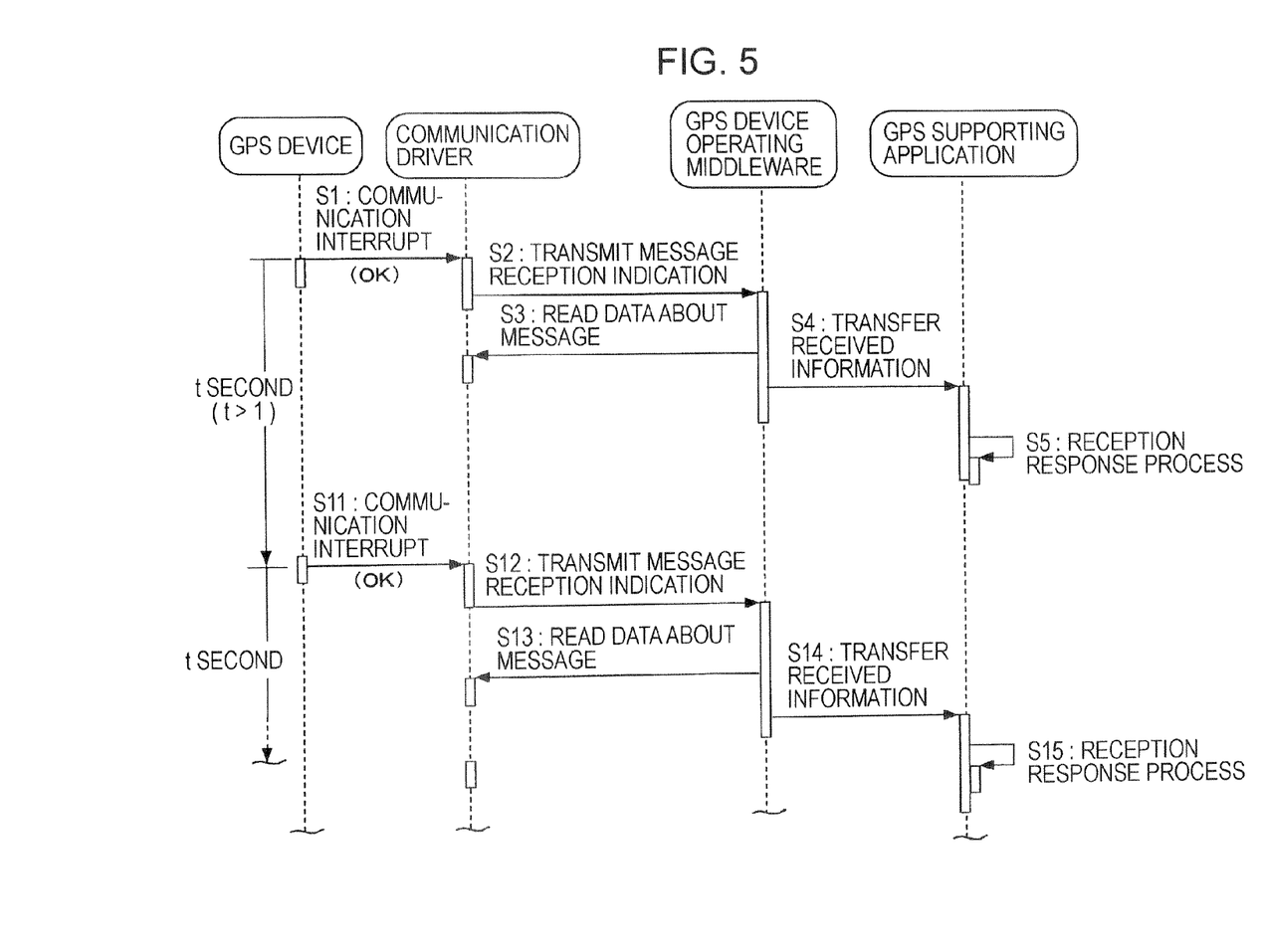
FIG. 5 shows an example of a communication process (normal process) between a GPS device and a host CPU when the operation of the GPS device is applied to the imaging apparatus, according to an embodiment of the present invention.

FIG. 5 shows an example of a normal communication process between the GPS device 3 and the host CPU 11, according to an embodiment of the present invention, in which effective positioning information is constantly yielded every "t" seconds.

For example, in Step S1, a time has arrived when the GPS device 3 transmits effective positioning information. Steps S2 to S5 are performed in response to Step S1, as in FIG. 4.

After the positioning information is transmitted in Step S1, the GPS device 3 performs the positioning calculation every one second, which is the default (the standard time interval), to acquire positioning information. However, according to the embodiment of the present invention, until before "t" seconds elapse since the positioning information was transmitted, the GPS device 3 does not transmit the positioning information internally acquired and stores the positioning information in, for example, the SRAM 31. After "t" seconds since the positioning information was transmitted, the GPS device 3 refers to the content of the positioning information stored in the SRAM 31 and transmits any effective positioning information.

Referring to FIG. 5, it is assumed that the effective positioning information is acquired and the acquired positioning information is stored in the SPAM 31 before "t" seconds elapse since the positioning information was transmitted in Step S1. Accordingly, after "t" seconds since the positioning information was transmitted in Step S1, then in Step S11, the GPS device 3 transmits the effective positioning information. The host CPU 11 performs Steps S12 to S15 in response to the transmission of the positioning information in Step S11. Steps S12 to S15 are similar to Steps S2 to S5, described above.

If multiple pieces of effective positioning information are stored in the SRAM 31, one piece of the effective positioning information may be selected from the multiple pieces thereof to transmit the selected piece of the effective positioning information. In the selection of the positioning information, for example, the recent piece of the effective positioning information is selected, although the selection rule is limited to this.

Figure 6:
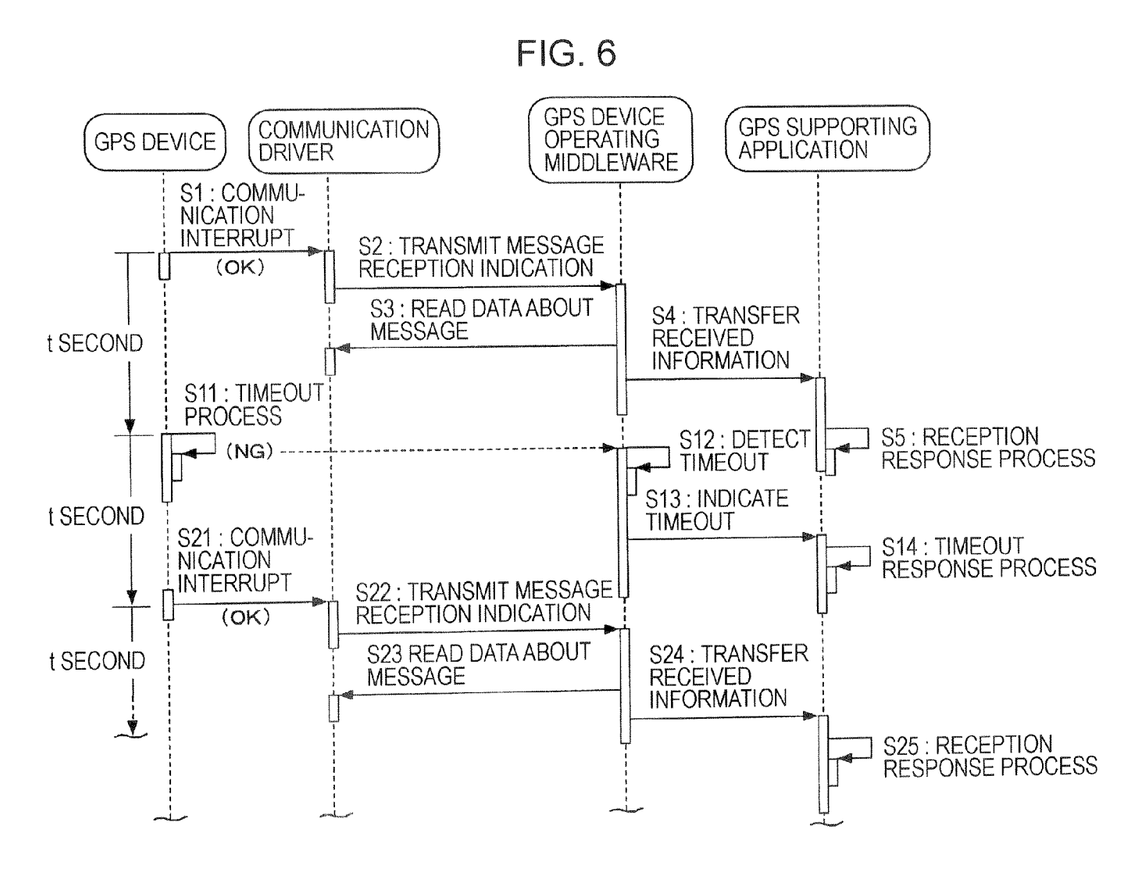
FIG. 6 shows an example of a communication process (non-normal process) between the GPS device and the host CPU when the operation of the GPS device is applied to the imaging apparatus, according to an embodiment of the present invention.

FIG. 6 shows an example of a non-normal communication process between the GPS device 3 and the host CPU 11, according to an embodiment of the present invention, in which effective positioning information is not constantly yielded every "t" seconds.

Referring to FIG. 6, in Step S1, the GPS device 3 transmits effective positioning information. Steps S2 to S5 are similar to Steps S2 to S5 in FIG. 5.

It is assumed that the positioning information which the GPS device 3 acquired every one second and stored in the SRAM 31 includes no effective positioning information and includes only ineffective positioning information before "t" seconds elapse since the positioning information was transmitted in Step S1.

In this case, in Step S11, the GPS device 3 restarts counting of "t" seconds as a timeout process. At this time, the GPS device 3 does not transmit the positioning information to the host CPU 11 (the communication driver 11c).

It is assumed that the GPS device 3 acquires effective positioning information and stores the acquired positioning information before "t" seconds elapse since the GPS device 3 has performed the timeout process in Step S11. In this case, after "t" seconds since the timeout process in Step S11, then in Step S21, the GPS device 3 transmits the effective positioning information. Steps S22 to S25 in response to Step S21 are similar to Steps S2 to S5.

As described above with reference to FIGS. 5 and 6, the time interval of "t" seconds (hereinafter referred to as a transmission time interval) longer than the standard time interval of one second is set in the embodiments of the present invention. Basically, a transmission time of the positioning information is set in association with the time interval of "t" seconds. If effective positioning information is acquired during the time interval of "t" seconds, the positioning information is transmitted at the transmission time. In contrast, if effective positioning information is not acquired during the time interval of "t" seconds, the positioning information is not transmitted at the transmission time.

If the timeout process is performed in, for example, in Step S11 and the positioning information is not transmitted, the GPS supporting application 11a can be required to perform the corresponding process depending on the content of the application. In this case, it is necessary for the GPS supporting application 11a to detect that the timeout occurs without any effective positioning information being acquired.

As an action against such a case, the host CPU 11 performs Steps S12 to S14 in response to the timeout process in Step S11 in the example shown in FIG. 6.

For example, the GPS device operating middleware 11b determines whether the timeout process is performed in the GPS device 3 (timeout detection). In this timeout detection, it is determined whether the subsequent message reception indication is received before about "t" seconds elapse since the last message reception indication was received. In the example shown in FIG. 6, since the subsequent message reception indication is not received before "t" seconds elapse since the message reception indication was received in Step S2, the timeout is detected in Step S12. After the timeout is detected, in Step S13, the GPS device operating middleware 11b indicates the timeout to the GPS supporting application 11a. In Step S14, the GPS supporting application 11a performs a timeout response process in response to the timeout indication. In other words, the GPS supporting application 11a performs a process corresponding to the result indicating that effective positional information is not acquired as the positioning information.

Modifying the content of the program, such as firmware, implemented in the GPS device 3 can change the way in which the GPS device 3 transmits the positioning information from the process in FIG. 4 to that in FIG. 5. In other words, the basic configuration according to the embodiments of the present invention is realized by the GPS device that executes the program implemented in, for example, the firmware.

Comparison of the communication process in the related art, shown in FIG. 4, with the communication processes according to the embodiments of the present invention, shown in FIGS. 5 and 6, provides the following results.

As apparent from the comparison between the communication processes shown in FIGS. 4 and 5, the positioning information is transmitted from the GPS device 3 at least every "t" seconds, which are longer than one second set as the standard transmission interval of the positioning information in the embodiments of the present invention. If no effective positioning information is acquired, the positioning information is not transmitted even after "t" seconds.

Consequently, the frequency of the transmission of the positioning information during the unit time is decreased, compared with the case in which the positioning information is constantly transmitted every one second, as in the related art. The decrease in the frequency of the transmission of the positioning information decreases the frequency of occurrences of the communication interrupt at the communication driver 11c in the host CPU 11 to reduce the load on the host CPU 11.

The GPS device 3 (GPS module) according to the embodiment of the present invention is mounted in the imaging apparatus, such as the video camera 100 or the digital still camera 200, as shown in FIG. 1. Such an imaging apparatus consumes a certain power of the CPU for the built-in imaging function. In the example shown in FIG. 3, the host CPU 11 in the shooting device 1 consumes a certain power for the imaging function.

When the addition of the GPS function causes the communication interrupt from the GPS device 3 to occur every one second in this situation, the load on the CPU is further increased. Depending on the process performed by the host CPU 11, the communication interrupt from the GPS device 3 can impose a heavier load on the CPU to adversely affect the performance of the imaging function. For example, an operational speed relating to the imaging function is possibly decreased.

Consequently, the decrease in the frequency of occurrences of the communication interrupt from the GPS device 3 in the manner according to the embodiment of the present invention alleviates an increase in the load on the host CPU 11 and allows the higher performance of the apparatus to be kept.

For example, when the GPS function is used in a navigation system, it can be effective and important to acquire the positioning information, along with the status indicating that the positional information is effective or ineffective, every one second.

However, depending on the application of the apparatus, the acquisition of the positioning information at the standard frequency, for example, at a frequency of around one second can produce an out-of-specification result. The same applies to the application of the GPS function in the video camera 100 or the digital still camera 200 according to the embodiment of the present invention for the following reason.

The video camera 100 or the digital still camera 200 according to the embodiment of the present invention uses the positional information yielded by the use of the GPS in the manner shown by (a), (b), (c), or (d) in FIG. 2. In such applications, it is enough for the positional information to be roughly associated with the position where the shooting is performing or where the shooting has been performed. Accordingly, any positional error is permitted to some extent and it is not necessary to positively detect the situation in which ineffective positioning information is acquired and to rapidly take actions. That is, the need to positively acquire ineffective positioning information is small. The acquisition of ineffective positioning information rather makes a demerit of the CPU power that is wastefully consumed obvious. Consequently, the applications according to the embodiment of the present invention do not require as accurate, highly frequent, and detailed positioning information as the navigation apparatus.

From the above point of view, as described above with reference to FIGS. 5 and 6, the communication process in which only effective positioning information is transmitted at time intervals (the transmission time interval) longer than one second (the standard time interval) is adopted in the embodiment of the present invention.

Other examples of the communication process between the GPS device 3 and the host CPU 11 according to embodiments of the present invention will be described with reference to FIGS. 7 and 8.

Figure 7:
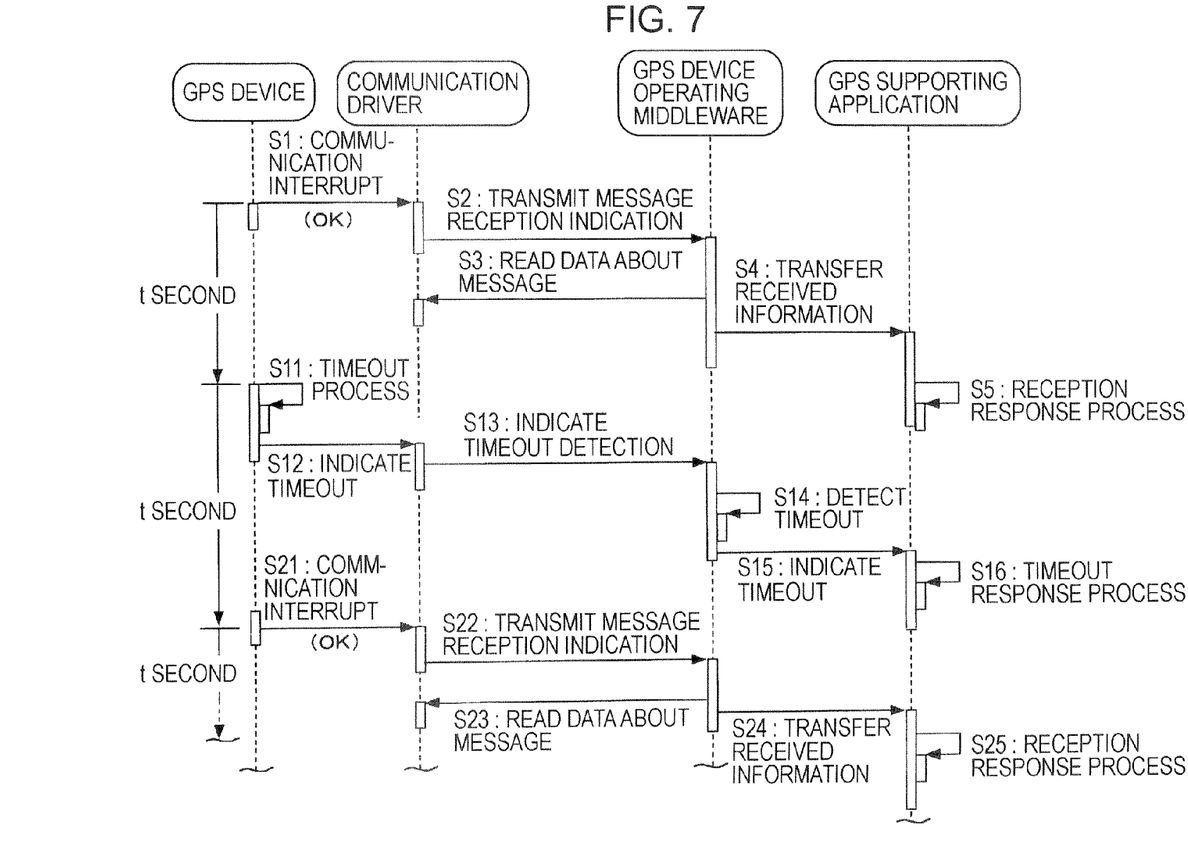
FIG. 7 shows another example of the communication process (non-normal process) between the GPS device and the host CPU when the operation of the GPS device is applied to the imaging apparatus, according to an embodiment of the present invention.

FIG. 7 shows a modification of the non-normal communication process described above with reference to FIG. 6.

Referring to FIG. 7, in Step S1, the GPS device 3 transmits effective positioning information. In response to Step S1, the host CPU 11 performs Steps S2 to S5.

If the GPS device 3 does not acquire effective positioning information before "t" seconds elapse since the positioning information was transmitted in Step S1, then in Step S11, the GPS device 3 performs a timeout process and resets the counting of "t" seconds not to transmit the positioning information. In Step S12, the GPS device 3 transmits a timeout indication to the communication driver 11c in the host CPU 11.

After receiving the timeout indication, in Step S13, the communication driver 11c indicates to the GPS device operating middleware 11b that the timeout is detected. In Step S14, the GPS device operating middleware 11b receives the timeout indication and detects the timeout. In Step S15, the GPS device operating middleware 11b transmits the timeout indication to the GPS supporting application 11a. In Step S16, the GPS supporting application 11a performs a timeout response process in response to the timeout indication.

As in the process in FIG. 6, since the GPS device 3 acquires and stores effective positioning information before "t" seconds elapse since the timeout process was performed in Step S11, Steps S21 to S25 similar to Steps S21 to S25 in FIG. 6 are performed.

As described above, in the example shown in FIG. 7, the timeout indication is transmitted from the GPS device 3 to the host CPU 11. Although the timeout indication from the GPS device 3 causes an interrupt, the load on the CPU is not increased because the frequency of occurrences of the interrupt is similar to that in the normal process in which effective positioning information is acquired every "t" seconds. In addition, since the GPS device 3 outputs the timeout indication, it is not necessary for the host CPU 11 to perform a process for detecting the timeout, such as a timer count, thus reducing the load on the host CPU 11. In contrast, in the process supporting the timeout, shown in FIG. 6, the load on the GPS device 3 is reduced. Although the load corresponding to the reception of the timeout indication in Step S12 is imposed on the host CPU 11, it is enough to implement a program including a processing routine for the timeout detection in the host CPU 11 and, therefore, the program can be more easily implemented, compared with a case where a function of managing the timeout is given to the GPS device 3.

As described above, according to the embodiment of the present invention, in consideration of the applications of the video camera 100 or the digital still camera 200, the time interval "t" longer than one second (the standard time interval) is set as the minimum time interval of the transmission of the positioning information.

However, there can be cases in which it is convenient to acquire the positioning information at time intervals shorter than "t" seconds. For example, if the position of a vehicle on which a user carrying the video camera 100 or the digital still camera 200 according to the embodiment of the present invention gets is greatly varied during a short period, it can be preferred to acquire the positioning information at time intervals shorter than "t" seconds. Alternatively, if only ineffective positioning information is continuously acquired over a predetermined time period, it can be necessary to transmit the positioning information at time intervals shorter than "t" seconds in order to acquire effective positioning information as soon as possible.

Figure 8:
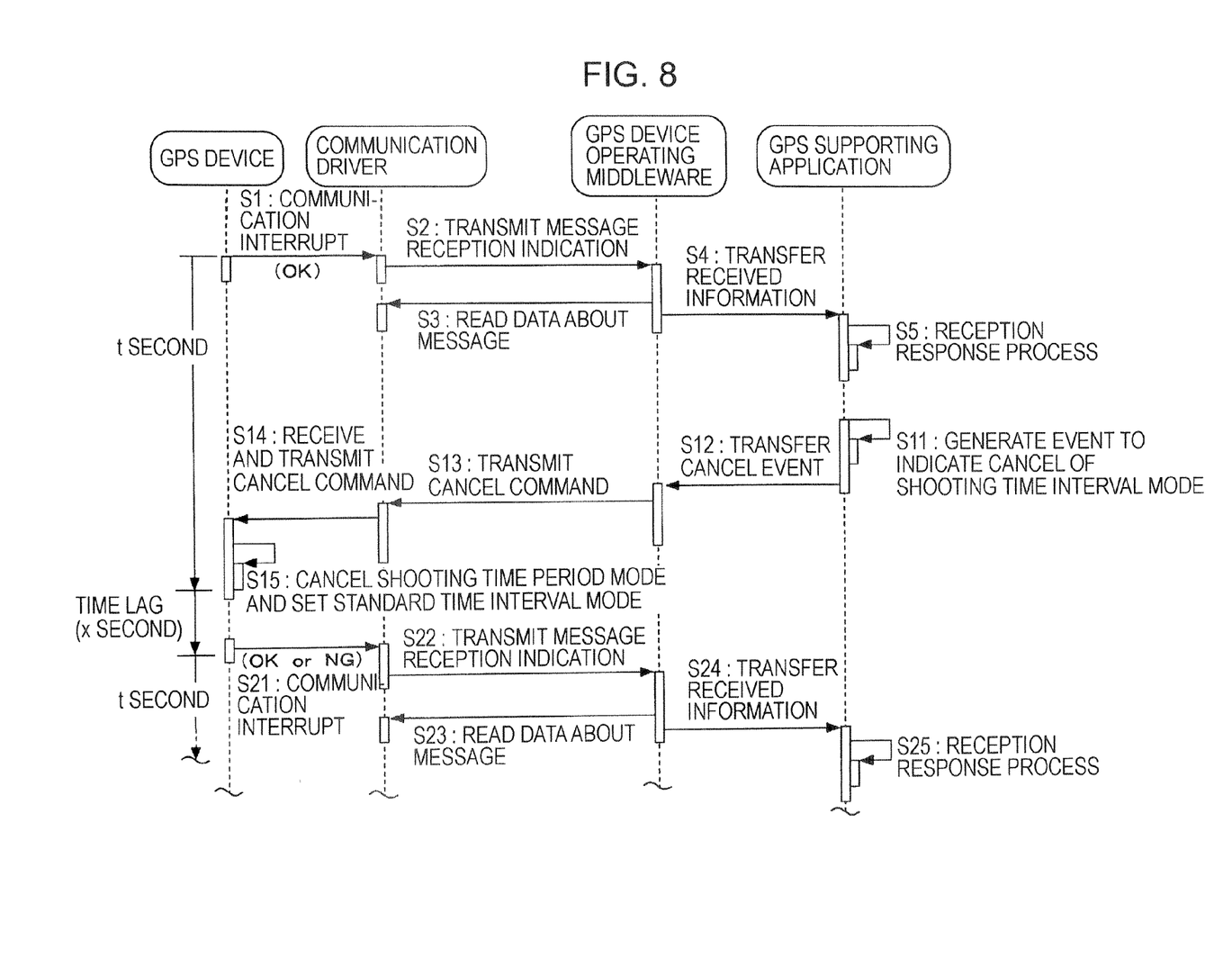
FIG. 8 shows an example of a communication process between the GPS device and the host CPU when the operation of the GPS device is applied to the imaging apparatus and the transmission time interval of positioning information can be varied, according to an embodiment of the present invention.

FIG. 8 shows an example of a communication process, according to an embodiment of the present invention, in a case in which the time interval of the transmission of the positioning information from the GPS device 3 can be varied. In the description in FIG. 8, the transmission of the positioning information at time intervals of one second, which is the default setting for the GPS device 3, is referred to as a "standard time interval mode", whereas the transmission of the positioning information at time intervals of at least "t" seconds longer than one second is referred to as a "shooting time interval mode" because this setting is for shooting applications.

Referring to FIG. 8, in Steps S1 to S5, the GPS device 3 transmits effective positioning information and the host CPU 11 performs the steps similar to Steps S1 to S5 in the examples shown in FIGS. 5 to 7. During the time period from a past time to the time when Step S1 is performed, the communication process, described above with reference to FIG. 5, 6, or 7, is performed at time intervals of "t" seconds. In other words, before the communication process (S1 to S5) is first performed, the "shooting time interval mode" is set as the communication mode for the positioning information transferred between the GPS device 3 and the host CPU 11. In the "shooting time interval mode", the positioning information is transmitted at shooting time intervals of "t" seconds.

At a time after Steps S1 to S5 were performed, in Step S11, the GPS supporting application 11a generates an event to instruct cancel of the shooting time interval mode, which has been set.

One trigger of generating this event is a switching operation from the shooting time interval mode to the standard time interval mode, described below.

In addition, a process performed if the acquisition state of the positioning information, monitored by the GPS supporting application 11a, satisfies a predetermined condition (or does not satisfy a predetermined condition) may be set as the trigger. In the example shown in FIG. 8, the GPS supporting application 11a can detect, for example, an approximate moving speed and the stability of the acquisition of effective positioning information on the basis of the content (positional information) of the positioning information sequentially received. The GPS supporting application 11a can generate the event to cancel the shooting time interval mode on the basis of the detected result. In the example shown in FIG. 8, the event to cancel the shooting time interval mode is generated before "t" seconds elapse since the effective positioning information was transmitted in Step S1. However, for example, in an algorithm for generating the event to cancel the shooting time interval mode if no effective positioning information is received over a predetermined time interval longer than "t" seconds, the timeout response process may be repeated a certain number of times before the event to cancel the shooting time interval mode is generated in Step S11.

In Step S12, the GPS supporting application 11a transfers the event to cancel the shooting time interval mode, generated in the above manner, to the lower-level GPS device operating middleware 11b. In Step S13, the GPS device operating middleware 11b converts the received event into a command to cancel the shooting time interval mode, which can be processed by the GPS device 3, and transmits the command to the communication driver 11c. In Step S14, the communication driver 11c transmits the command to cancel the shooting time interval mode to the GPS device 3. After receiving the command to cancel the shooting time interval mode, in Step S15, the GPS device 3 cancels the set shooting time interval mode and sets the standard time interval mode. Specifically, the GPS device 3 stops the operation mode (the shooting time interval mode) in which only the effective positioning information is transmitted from the GPS device 3 to the host CPU 11 at time intervals of at least "t" seconds, and enables the operation mode (the standard time interval mode) in which the positioning information is constantly transmitted every one second regardless of whether the positioning information is effective or ineffective and which is the standard operation mode corresponding to the default of the GPS device 3. The GPS device 3 performs the switching of the operation mode to modify the settings of, for example, the internal firmware.

After the shooting time interval mode is switched to the standard time interval mode in the manner described above, the GPS device 3 operates in the standard time interval mode. In the example in FIG. 8, after a time lag of "x" seconds since the switching to the standard time interval mode was performed in Step S15, then in Step S21, the GPS device 3 transmits the positioning information for the first time in the standard time interval mode. For confirmation, since the standard time interval mode is the default for the GPS device 3, the positioning information is transmitted every one second regardless of whether the positioning result is effective or ineffective. Steps S22 to S25 in response to Step S21 are similar to Steps S1 to S5, Steps S11 to S15, and Steps S21 to S25 shown in, for example, in FIG. 4.

In the example shown in FIG. 8, the shooting time interval mode is cancelled and the standard time interval mode is set. In terms of the time interval of the transmission of the positioning information, "t" seconds are changed to one second shorter than "t" seconds. The standard time interval mode is set as the default in the GPS device 3 for the positioning and output, so that the switching between the modes has the advantage of the algorithm that is not complicated.

However, when such an algorithm is not considered, the time interval of the transmission of the positioning information may be switched between, for example, "t" seconds and "m" seconds (1<m<t).

The present invention is not limited to the embodiments described above. For example, the standard for the communication bus between the GPS device and the CPU is not limited to UART. In addition, the communication protocol between the GPS device and the CPU may conform to a standard that is currently developing or that will be developing, other than the NMEA. The hierarchical configuration of the program that is implemented in the CPU (host CPU 11) and that supports the GPS device is not limited to inclusion of the GPS supporting application 11a, the GPS device operating middleware 11b, and the communication driver 11c, as in the example shown in FIG. 3.

The present invention is applicable to any apparatus having the GPS function, in addition to the video camera 100 and the digital still camera 200.

It should be understood by those skilled in the art that various modifications, combinations, sub-combinations and alterations may occur depending on design requirements and other factors insofar as they are within the scope of the appended claims or the equivalents thereof.

What is claimed is:

1. A positioning information processing apparatus comprising:
  positioning information acquiring means for acquiring positioning information at predetermined time intervals; and
  positioning information transmitting means for transmitting the positioning information acquired by the positioning information acquiring means through a predetermined data communication path only if the positioning information is effective, the positioning information transmitting means setting a transmission time interval longer than the predetermined time intervals as a minimum time interval at which the positioning information is transmitted, the positioning information transmitting means transmitting the effective positioning information at a transmission time associated with the current transmission time interval if effective positioning information is acquired by the positioning information acquiring means during a current transmission time interval, and the positioning information transmitting means not transmitting the positioning information at the transmission time associated with the current transmission time interval if effective positioning information is not acquired by the positioning information acquiring means during the current transmission time interval.

2. The positioning information processing apparatus according to claim 1, wherein, if effective positioning information is not acquired by the positioning information acquiring means during the current transmission time interval, the positioning information transmitting means indicates that effective positioning information is not acquired during the current transmission time interval, at the transmission time associated with the current transmission time interval.

3. The positioning information processing apparatus according to claim 1, wherein the positioning information transmitting means is capable of switching between transmission operation of the positioning information at the transmission time intervals and transmission operation of the positioning information at shorter transmission time intervals shorter than the transmission time intervals,
  wherein, if effective positioning information is acquired by the positioning information acquiring means during a current shorter transmission time interval, the positioning information transmitting means transmits the acquired effective positioning information at a time when the current shorter transmission time interval is terminated, and
  wherein, if effective positioning information is not acquired by the positioning information acquiring means during the current shorter transmission time interval, the positioning information transmitting means does not transmit the positioning information or transmits ineffective positioning information acquired by the positioning information acquiring means during the current shorter transmission time interval, at the time when the current shorter transmission time interval is terminated.

4. An information processing apparatus comprising:
  positioning information acquiring means for acquiring positioning information at predetermined time intervals;
  positioning information transmitting means for transmitting the positioning information acquired by the positioning information acquiring means through a predetermined data communication path only if the positioning information is effective, the positioning information transmitting means setting a transmission time interval longer than the predetermined time intervals as a minimum time interval at which the positioning information is transmitted, the positioning information transmitting means transmitting the effective positioning information at a transmission time associated with the current transmission time interval if effective positioning information is acquired by the positioning information acquiring means during a current transmission time interval, and the positioning information transmitting means not transmitting the positioning information at the transmission time associated with the current transmission time interval if effective positioning information is not acquired by the positioning information acquiring means during the current transmission time interval; and positioning information processing means for receiving and acquiring the positioning information transmitted through the data communication path and using the positioning information to perform a process for realizing a predetermined functional operation.

5. The information processing apparatus according to claim 4, wherein the positioning information processing means performs a predetermined process corresponding to the fact that effective positioning information is not received if the positioning information is not received and acquired over a predetermined time period.

6. A method of processing positioning information, the method comprising:

acquiring the positioning information at predetermined time intervals; and transmitting the positioning information acquired by the positioning information acquiring step through a predetermined data communication path only if the positioning information is effective, the transmitting including, transmitting at a transmission time interval longer than the predetermined time intervals, transmitting effective positioning information at a transmission time associated with a current transmission time interval if effective positioning information is acquired by the positioning information acquiring means during the current transmission time interval, and not transmitting the positioning information at the transmission time associated with the current transmission time interval if effective positioning information is not acquired by the positioning information acquiring means during the current transmission time interval.

7. A computer readable medium including computer executable instructions, wherein the instructions, when executed by a processor, cause the processor to perform a method comprising:

acquiring positioning information at predetermined time intervals; and transmitting the positioning information acquired by the positioning information acquiring step through a predetermined data communication path only if the positioning information is effective, the transmitting including, transmitting at a transmission time interval longer than the predetermined time intervals, transmitting effective positioning information at a transmission time associated with a current transmission time interval if effective positioning information is acquired by the positioning information acquiring means during the current transmission time interval, and not transmitting the positioning information at the transmission time associated with the current transmission time interval if effective positioning information is not acquired by the positioning information acquiring means during the current transmission time interval.

8. A positioning information processing apparatus comprising:

a positioning information acquiring unit configured to acquire positioning information at predetermined time intervals; and a positioning information transmitting unit configured to transmit the positioning information acquired by the positioning information acquiring unit through a predetermined data communication path only if the positioning information is effective, the positioning information transmitting unit configured to transmit at a transmission time interval longer than the predetermined time intervals, the positioning information transmitting unit configured to transmit effective positioning information at a transmission time associated with a current transmission time interval if effective positioning information is acquired by the positioning information acquiring means during the current transmission time interval, and the positioning information transmitting unit configured to not transmit the positioning information at the transmission time associated with the current transmission time interval if effective positioning information is not acquired by the positioning information acquiring means during the current transmission time interval.

9. An information processing apparatus comprising:

a positioning information acquiring unit configured to acquire positioning information at predetermined time intervals;

a positioning information transmitting unit configured to transmit the positioning information acquired by the positioning information acquiring unit through a predetermined data communication path only if the positioning information is effective, the positioning information transmitting unit configured to set a transmission time interval longer than the predetermined time intervals as a minimum time interval at which the positioning information is transmitted, the positioning information transmitting unit configured to transmit the effective positioning information at a transmission time associated with the current transmission time interval if effective positioning information is acquired by the positioning information acquiring unit during a current transmission time interval, and the positioning information transmitting configured to not transmit the positioning information at the transmission time associated with the current transmission time interval if effective positioning information is not acquired by the positioning information acquiring unit during the current transmission time interval; and a positioning information processing unit configured to receive and acquire the positioning information transmitted through the data communication path and to use the positioning information to perform a process for realizing a predetermined functional operation.

10. The positioning information processing apparatus according to claim 8, wherein, the positioning information transmitting unit is configured to transmit an indication that effective positioning information is not acquired during the current transmission time interval at the transmission time associated with the current transmission time interval if effective positioning information is not acquired by the positioning information acquiring means during the current transmission time interval.

11. The positioning information processing apparatus according to claim 8, wherein the positioning information transmitting means is capable of switching between transmission operation of the positioning information at the transmission time intervals and transmission operation of the positioning information at second transmission time intervals shorter than the transmission time intervals, the positioning information transmitting unit is configured to transmit the acquired effective positioning information at a time when a current second transmission time interval is terminated if effective positioning information is acquired by the positioning information acquiring means during the current second transmission time interval, and the positioning information transmitting unit is configured to not transmit the positioning information or to transmit ineffective positioning information acquired by the positioning information acquiring unit during the current second transmission time interval at the time when the current second transmission time interval is terminated if effective positioning information is not acquired by the positioning information acquiring unit during the current second transmission time interval.

* * * * *